Sept. 28, 1965 G. LEHNERT 3,208,256
APPARATUS FOR THE MANUFACTURE OF CORRUGATED
THIN WALLED METAL TUBES
Filed May 17, 1962
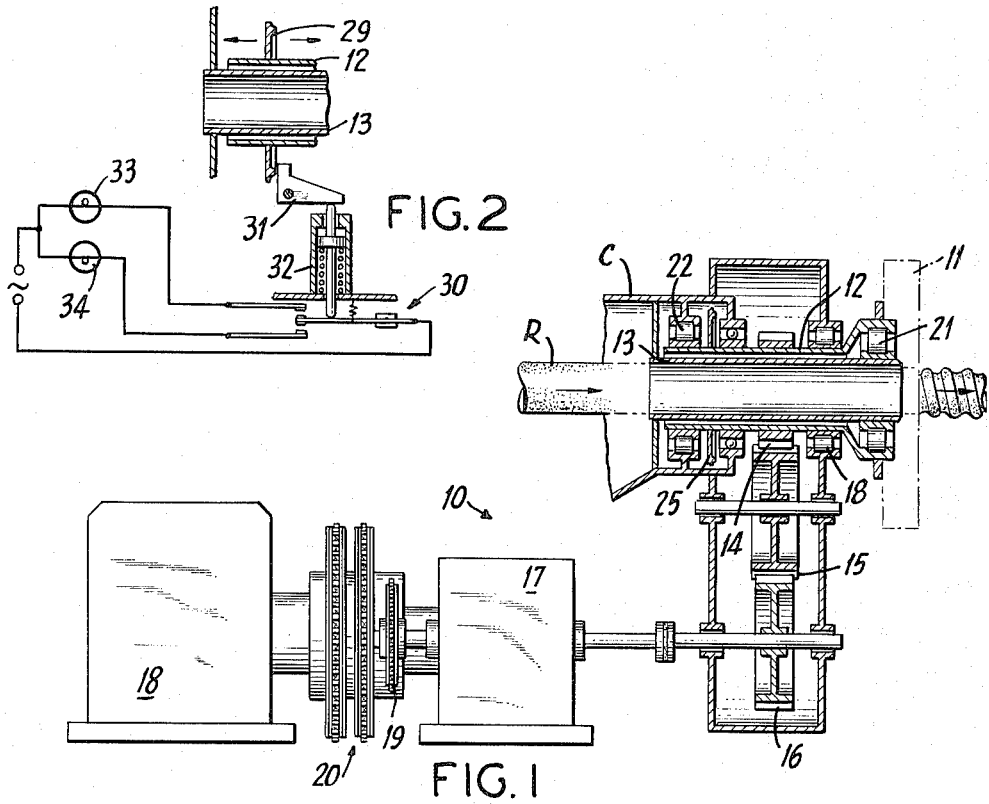
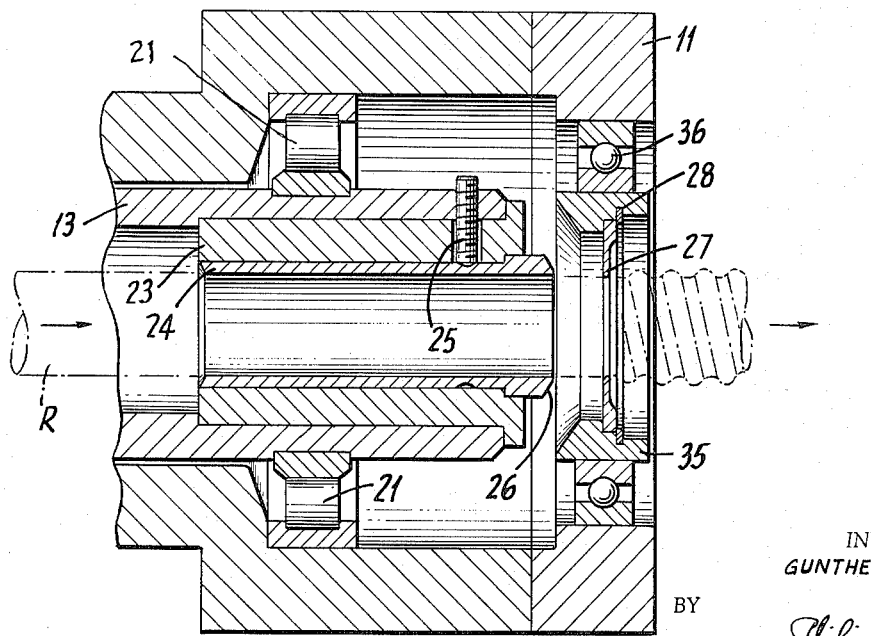
INVENTOR.
GUNTHER LEHNERT
BY
ATTORNEY.

United States Patent Office 3,208,256
Patented Sept. 28, 1965

3,208,256
APPARATUS FOR THE MANUFACTURE OF CORRUGATED THIN WALLED METAL TUBES
Gunther Lehnert, Hannover-Bothfeld, Germany, assignor to Hackethal Draht- und Kabel Werke A.G., Hannover, Germany, a corporation of Germany
Filed May 17, 1962, Ser. No. 195,601
Claims priority, application Germany, May 17, 1961, H 42,624
4 Claims. (Cl. 72—77)

This invention relates to the formation of corrugated metal tubing, and more particularly concerns the conversion of a thin metal strip into tubular form with a longitudinal welded seam, which may be combined with an electrical cable core as a sheath therefor; the sheath being corrugated to provide for flexibility.

In forming metal sheathed cable, the sheathed cable is drawn off by suitable means from a welding station where the sheath seam is continuously formed, to a corrugating station where helical corrugations are impressed in the metal sheath by means of a rotary corrugating ring, suitably mounted for the purpose.

To form a uniform helical corrugation in the metal tubing wall, it is necessary that the forming ring rotate freely about the tubing. This is usually accomplished by mounting such ring interiorly of a rotary holder. The holder and drawoff device are simultaneously coupled to a driving motor so that both holder and drawoff device operate at the same speed.

However, in some instances, the holder may tend to operate at a speed different from that of the drawoff device, but is compelled to rotate at the same speed because of the common drive means. This may occur when the metal of the tubing has a hardness which increases the frictional resistance to the action of the corrugating device, acting to retard the rotation of the holder; and thus leads to the formation of irregular corrugations or even damage to the forming ring on the holder.

Also, with known devices, the tubular bushing which guides the metal tubing to the corrugating device, is pivoted on the machine casing. The freely turning guide means cannot absorb the torsional stresses induced by the action of the forming ring as it corrugates the tubing. In this case torsional displacement may take place within the tubing at the corrugating station and the stresses may be transmitted back to the welding station resulting in imperfect welded seam portions.

Accordingly, an object of this invention is to provide an improved apparatus for corrugating metal tubing as it is drawn off from a seam welding station, and which includes improved means for substantially eliminating torsional stresses.

Another object of this invention is to provide in a device of the character described driving means for a drawoff device and corrugating means wherein the speed of rotation of the corrugating means may be adjusted in relation to the operation of the drawoff device.

A further object of this invention is to provide in a device of the character described, improved tubular guide means for passing metal tubing to a corrugating device.

In the drawing, FIG. 1 is a diagrammatic showing, in elevation, of a corrugating apparatus embodying the invention;

FIG. 2 is a diagrammatic showing of an indicator portion of said apparatus; and

FIG. 3 is an enlarged, longitudinal sectional view showing details of the forming ring and associated elements.

As shown in FIG. 1, the corrugating apparatus embodying the invention, is generally indicated at 10. The same comprises a forming ring holder 11 which is fixedly connected to the forward end of a tubular sleeve 12. Sleeve 12 is concentrically and coaxially related to and rotates about a fixed tubular guide member 13.

Sleeve 12 is rotated by a gear train 14, 15, and 16 which is driven by a variable speed mechanism 17, from a motor 18. Mechanism 17 is suitably regulated from a chain drive 19 connected to a manually operated gear, not shown. The motor 18 also operates a drawoff device, not shown for transporting the tubing R which is to be corrugated, through device 10, through a power takeoff indicated at 20.

The holder 11 is guided for axial movement relative to guide member 13 by slide bearings 21, while sleeve 12 is guided for axial movement relative to the machine casing C by slide bearings 22. The slide bearings are parallel roller bearings and are movable axially as indicated. The bending stresses produced in sleeve 12 during the corrugating operation are collected by bearings 21, 22.

As shown in FIG. 3, interiorly of guide member 13 is located an outer tubular member 23 and an inner tubular member 24 which are interconnected by a screw 25. The inside diameter of member 24 is such as to make a snug fit with the tubing R as it passes to the corrugating device. The peripheral edge 26 of member 24 supports tubing R during the corrugating operation and torsional stresses growing out of such operation is absorbed at this point, thus avoiding torsional displacement of the tubing.

With variable speed mechanism 17 it is possible to vary the speed of the corrugating system independently of the rate of feed of the drawoff device through takeoff 20. Thus, when the rotational speed of the forming ring 27 held in place on holder 11 by snap ring 28, is braked due to very high frictional resistance offered by a metal having unusual hardness; such speed may be adjusted by suitable operation of drive 19, without reducing the motor power transmitted to the corrugating system.

Also, with the corrugating system movable on guide member 13, it is possible to equalize the braking action of ring 27 arising from metals of undue hardness. Thus, the ring 27 is maintained in a "swimming" axial movement relative to member 13 so as to avoid overstresses or damage to the ring 27.

The axial movement of the corrugating system is limited by an annular member 29 fixed on sleeve 12. Such member operates a double pole switch 30 through a bell crank lever 31 and spring pressed switch actuating mechanism 32, to energize indicator lights 33 or 34 in accordance with the relative position of member 29. Thus, lights 33, 34 will indicate the limits of operation of the system in terms of pushing or pulling. Accordingly, the variable speed mechanism 17 will be operated so that neither light 33, 34 is energized, leaving the drawoff speed at a predetermined value and the rotation of the corrugating system adjusted so that ring 27 revolves without pushing or pulling.

The forming ring 27 and snap ring 28 are mounted in a ring shaped member 35 which in turn is mounted in holder 11 by ball bearings 36, as shown in FIG. 3.

It is understood that the indicator lights 33, 34 provide means for checking the system so as to indicate when mechanism 17 is to be operated, as when metal of undue hardness is being corrugated, yet without reduction of power transmitted to the corrugating system. Also, any change in the drawoff speed by way of takeoff 20, will be reflected in the rotational speed of holder 11.

What is claimed is:
1. Apparatus for continuously corrugating thin walled metal tubing comprising a fixed tubular guiding member for passing the tubing to be corrugated, a tubular sleeve concentrically related to and disposed exteriorly of said guiding member, a forming ring holder fixed to the forward end of said sleeve, a forming ring, bearing means between said forming ring and said ring holder to allow said forming ring to turn freely within said holder, and means for imparting rotary and axial movement of said sleeve relative to said guiding member.

2. Apparatus as in claim 1 wherein said last mentioned means includes motor means for driving a power take off for a drawoff means at a determined speed, variable speed mechanism operated by said motor means and gear means connecting the output of said variable speed mechanism and said sleeve for rotating said sleeve at selected speeds independently of the determined speed of said power take-off.

3. Apparatus as in claim 2 wherein said tubular guiding member includes tubular means interiorly thereof having an inside diameter for snugly receiving said metal tubing therein, the outer edge of said tubular means supporting said tubing at a point adjacent the engagement thereof by said forming ring.

4. Apparatus as in claim 1 and further including a pair of longitudinally spaced limit means for indicating the axial travel of said sleeve to selected longitudinally spaced points, and signal means operated by said limit means.

References Cited by the Examiner
UNITED STATES PATENTS

| | | | |
|---|---|---|---|
| 2,076,236 | 4/37 | Holloway. | |
| 2,157,598 | 5/39 | Fentress et al. | 153—71 |
| 2,611,413 | 9/52 | Molinare | 153—71 |

CHARLES W. LANHAM, *Primary Examiner.*